(12) United States Patent
Hong et al.

(10) Patent No.: US 12,196,300 B2
(45) Date of Patent: Jan. 14, 2025

(54) DIFFERENTIAL, POWERTRAIN, AND VEHICLE

(71) Applicant: HUAWEI DIGITAL POWER TECHNOLOGIES CO., LTD., Shenzhen (CN)

(72) Inventors: Jian Hong, Shanghai (CN); Senlin Ma, Shanghai (CN); Jian Chen, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/502,882

(22) Filed: Nov. 6, 2023

(65) Prior Publication Data

US 2024/0159303 A1 May 16, 2024

(30) Foreign Application Priority Data

Nov. 10, 2022 (CN) .......................... 202211405556.X

(51) Int. Cl.
*F16H 48/40* (2012.01)
*B60K 17/16* (2006.01)
(Continued)

(52) U.S. Cl.
CPC ............ *F16H 48/40* (2013.01); *B60K 17/165* (2013.01); *F16H 48/08* (2013.01); *F16H 57/023* (2013.01);
(Continued)

(58) Field of Classification Search
CPC ........ F16H 48/40; F16H 48/08; F16H 57/023; F16H 57/0424; F16H 57/0483; F16H 2057/02052; B60K 17/165
(Continued)

(56) References Cited

U.S. PATENT DOCUMENTS 9,657,827 B2 * 5/2017 Gopal .................... F16H 48/24
2005/0070394 A1 * 3/2005 Sugeta .................... F16H 48/08
475/230
(Continued)

FOREIGN PATENT DOCUMENTS

CN 218644758 U 3/2023
DE 202013008950 U1 2/2014
(Continued)

OTHER PUBLICATIONS

Extended European Search Report in European Appln No. 23207879.0, dated Mar. 11, 2024, 8 pages.

*Primary Examiner* — Roger L Pang
(74) *Attorney, Agent, or Firm* — Fish & Richardson P.C.

(57) ABSTRACT

This application describes examples of a differential device, a powertrain, and a vehicle. In one example, the differential device includes a housing, three planetary gears, two side gears, and at least one window. Each of the three planetary gears is mounted on an inner wall of the housing through a pin shaft, the three planetary gears are disposed spaced from each other along a circumferential direction of the housing. The two side gears are disposed on two sides of the three planetary gears along the axial direction of the housing and meshed with the three planetary gears. The main reduction gear drives the housing to rotate around the axial direction of the housing, so that the three planetary gears drive the two side gears to drive two drive shafts respectively.

20 Claims, 11 Drawing Sheets

(51) Int. Cl.
    *F16H 48/08*     (2006.01)
    *F16H 57/023*     (2012.01)
    *F16H 57/04*     (2010.01)
    *F16H 57/02*     (2012.01)

(52) U.S. Cl.
    CPC ..... *F16H 57/0424* (2013.01); *F16H 57/0483* (2013.01); *F16H 2057/02052* (2013.01)

(58) Field of Classification Search
    USPC ................................ 475/230, 160; 74/606 R
    See application file for complete search history.

(56) References Cited

U.S. PATENT DOCUMENTS

| | | | |
|---|---|---|---|
| 2008/0015076 A1* | 1/2008 | Fusegi | F16H 48/24 475/252 |
| 2010/0184552 A1* | 7/2010 | Soybel | F16H 48/11 475/230 |
| 2010/0256879 A1 | 10/2010 | Povirk et al. | |
| 2022/0010869 A1* | 1/2022 | Kousaie | F16H 48/40 |

FOREIGN PATENT DOCUMENTS

| | | |
|---|---|---|
| EP | 1555459 A1 | 7/2005 |
| WO | 2008104198 A1 | 9/2008 |
| WO | 2016160657 A1 | 10/2016 |

\* cited by examiner

DIFFERENTIAL, POWERTRAIN, AND VEHICLE

CROSS-REFERENCE TO RELATED APPLICATIONS

This application claims priority to Chinese Patent Application No. 202211405556.X, filed on Nov. 10, 2022, which is hereby incorporated by reference in its entirety.

TECHNICAL FIELD

This application relates to the field of vehicle technologies, and in particular to, a differential, a powertrain, and a vehicle.

BACKGROUND

During operation, a differential generates heat, which causes a temperature of the differential to rise. In addition, components including a plurality of gears, a gear shaft, a pin shaft, and the like are disposed inside the differential. When the differential is working, components that are in contact with each other or are coupled to each other generate heat through friction. If the differential is not cooled or lubricated in time, performance of the differential is affected. In the conventional technology, a cooling window needs to be disposed on a housing of the differential for coolant oil to pass through, and the coolant oil cools and lubricates the differential to ensure the performance of the differential.

However, not only the cooling window needs to be disposed on the housing of the differential, but also space is required to accommodate cooperation of a planetary gear and a side gear. A quantity of planetary gears affects not only a bearing capability of the differential, but also affects heat generated by the differential. Usually, when a bearing capability of the differential is higher, a larger housing of the differential and a cooling window need to be disposed. Therefore, it is difficult for a conventional differential to meet requirements of a bearing capability, a cooling effect, and volume miniaturization.

SUMMARY

This application provides a differential that can consider a bearing capability, a cooling effect, and volume miniaturization, a powertrain, and a vehicle.

According to a first aspect, this application provides a differential. The differential includes a housing, three planetary gears, two side gears, and at least one window. The differential is configured to receive, through a main reduction gear, power transmitted by a power source and drive two drive shafts. The housing is configured to be fixedly connected to the main reduction gear, and the housing can rotate around an axial direction of the housing under a drive of the main reduction gear. Each of the three planetary gears is mounted on an inner wall of the housing through a pin shaft, the three planetary gears are disposed spaced from each other along a circumferential direction of the housing, and the circumferential direction of the housing is a direction of rotation of the housing; the two side gears are disposed on two sides of the three planetary gears along the axial direction of the housing, and each side gear is meshed with the three planetary gears. The at least one window is used for inflow or outflow of coolant, and the window penetrates through the housing and is located between axes of two adjacent planetary gears. The main reduction gear drives the housing to rotate around the axial direction of the housing, so that the three planetary gears drive the two side gears to drive the two drive shafts respectively. In addition, the coolant may lubricate or cool the three planetary gears and the two side gears inside the housing of the differential through the at least one window for inflow or outflow.

In this application, the three planetary gears are disposed, so that not only a bearing capability of the differential can be improved, but also the window can be disposed in cooperation in the housing, and active lubrication and cooling of the differential can be implemented through the window, to reduce wear of the differential, prevent the differential from being damaged due to an excessively high temperature, improve a service life of the differential, and ensure secure operation of the differential. In addition, the window in the differential is located between the two adjacent planetary gears, so that a volume of a housing of the differential can be reduced, thereby meeting requirements of the bearing capability, a cooling effect, and volume miniaturization.

In the circumferential direction of the housing, the window is located between the axes of the two adjacent planetary gears. In this way, the window does not interfere with mounting of the planetary gears, and the housing has higher structural strength and a stronger bearing capability. In addition, the housing has large space between the axes of the two planetary gears, and the space may be used to dispose the window. A larger area of the window makes it easier for coolant oil to lubricate and dissipate heat for an internal component of the differential through the window.

In a possible implementation, an inner surface of the housing has three planetary gear mounting surfaces disposed spaced from each other along the circumferential direction of the housing, the three planetary gear mounting surfaces are respectively used to mount the three planetary gears, and the window is located between two adjacent planetary gear mounting surfaces. The planetary gear mounting surfaces may be disposed, so that the planetary gears and the side gears are in a good meshing state. The window is located between the two adjacent planetary gear mounting surfaces, so that the window does not interfere with mounting of the planetary gears. The planetary gear mounting surfaces are force-bearing parts of the planetary gears, and the window is disposed away from the planetary gear mounting surfaces, so that the housing has higher structural strength and a stronger bearing capability. In addition, the housing between the two planetary gear mounting surfaces has large space while high strength of the housing is ensured, and the space may be used to dispose the window. A larger area of the window makes it easier for the coolant oil to lubricate and dissipate heat for the internal component of the differential through the window.

In a possible implementation, the planetary gear mounting surfaces protrude inwardly from the inner surface of the housing. The planetary gears are prevented from contacting with and rubbing against the inner wall of the housing, so that rotation of the planetary gears is smoother, and there is a specific distance between the housing and the planetary gears. This is beneficial for disposing the window.

In a possible implementation, two side gear mounting surfaces that are disposed oppositely to each other along the axial direction of the housing are disposed on an inner surface of the housing, the two side gear mounting surfaces are respectively used to mount the two side gears, and the window is located between two adjacent side gear mounting surfaces. The side gear mounting surfaces may be disposed, so that the planetary gears and the side gears are in a good meshing state. The window is located between the two adjacent side gear mounting surfaces, so that an area of the window may be larger.

In a possible implementation, a ratio of a total area of the at least one window to a surface area of the housing is greater than or equal to ⅓. A larger area of the window makes it easier for the coolant oil to lubricate and dissipate heat for the internal component of the differential through the window. A ratio of a total area of all windows to the surface area of the housing is set to be greater than or equal to ⅓, to ensure that the differential can be fully lubricated and cooled, and improve reliability of the differential. The total area of the at least one window is a sum of opening areas of all the windows. For example, when there is one window, the total area is an opening area of the window; and when there are three windows, the total area is a sum of opening areas of the three windows.

In a possible implementation, the ratio of the total area of the at least one window to the surface area of the housing is greater than or equal to ½. In a possible implementation, the ratio of the total area of the at least one window to the surface area of the housing may alternatively be less than ⅓ when a cooling effect is not required to be high.

In a possible implementation, to ensure lubrication and cooling effects of the coolant oil on the differential, a plurality of windows may be disposed on the housing and an area of each window may be increased. In a possible implementation, a window with a large area may be disposed between the axes of the two planetary gears on the housing, or a plurality of windows may be disposed.

In a possible implementation, the at least one window includes three windows, and the three windows and the three planetary gears are disposed in an alternating sequence in the circumferential direction of the housing. In this way, the coolant oil entering from the window may be directly sprayed to an opposite planetary gear, to improve the cooling effect of the coolant oil on the differential.

In a possible implementation, the three planetary gears are respectively sleeved on the three pin shafts, and one end of each of the pin shafts is fastened to the housing, and the other ends of the three pin shafts are fastened to each other via a central sleeve ring. The pin shafts provide a rotating support structure for the planetary gears, to improve rotation stability of the planetary gears. The three pin shafts are connected in a dismountable manner through the central sleeve ring. This is beneficial for mounting and dismounting of the pin shafts.

In a possible implementation, three grooves are disposed on the central sleeve ring, and one end of each of the three pin shafts is inserted into each of the three grooves, so that one end of each of the three pin shafts is fastened on the central sleeve ring. The three pin shafts are connected in a dismountable manner through the central sleeve ring. This is beneficial for the mounting and dismounting of the pin shafts.

In a possible implementation, the three pin shafts are in a same plane, and an included angle between two adjacent pin shafts is 120 degrees, or an included angle between two adjacent pin shafts is about 120 degrees if a deviation is within a process error range of 5 degrees. Forces of the three pin shafts may be optimized if the pin shafts are evenly distributed.

In a possible implementation, three pin shaft mounting holes in the circumferential direction of the housing are disposed on the housing, and the other ends of the three pin shafts are respectively fastened in the three pin shaft mounting holes.

In a possible implementation, the differential further includes three pin shaft fastened pins. Three pin shaft holes are further disposed on the housing, and a hole channel is disposed on each of the three pin shafts. Three pin shaft fixing holes are disposed on the housing, and the three pin shaft fixing holes are respectively located in the three pin shaft mounting holes. The pin shaft fastened pins sequentially pass through corresponding pin shaft holes, hole channels, and the pin shaft fixing holes along the axial direction, to fix the other ends of the pin shafts in the pin shaft mounting holes. In an implementation in which the pin shafts are fastened outside the housing, it is more convenient for dismounting of the differential.

In a possible implementation, in an axial direction of the side gears, at least one of the three pin shaft mounting holes overlaps at least partially with one of the windows. At least a part of windows may be disposed along a radial direction of the side gears to face the pin shafts, so that the coolant oil may directly cool the pin shafts and the planetary gears when entering the housing from the window along a radial direction, to improve the cooling effect on the differential.

In a possible implementation, the housing includes a housing base and a concave sub-housing that are connected along the axial direction of the housing, and the two side gears are respectively mounted on the housing base and the concave sub-housing, and the window is located in the concave sub-housing. The housing base and the concave sub-housing that are connected in a dismountable manner are disposed, so that it is convenient for dismounting and maintenance of the differential.

In a possible implementation, the concave sub-housing includes a concave sub-housing base, a concave sub-housing body, and a concave sub-housing top that are sequentially connected along the axial direction of the housing, and the concave sub-housing base is fastened to the housing base. One of the side gears is mounted on an inner side of the concave sub-housing top, the window is disposed on the concave sub-housing body, and the window separately adjoins the concave sub-housing base and the concave sub-housing top along two side walls of the axial direction of the housing. Because the concave sub-housing base and the concave sub-housing top are located at two ends of the housing, the window adjoins the concave sub-housing base and the concave sub-housing top, so that an opening area of the window is large. This is beneficial for the coolant to enter the housing.

In a possible implementation, a first mounting hole is disposed on a side that is of the housing base and that is close to the concave sub-housing, a second mounting hole is disposed on a side that is of the concave sub-housing base and that is close to the housing base, and a third mounting hole is disposed on the main reduction gear. A bolt is further disposed on the differential, the bolt sequentially passes through the third mounting hole, the first mounting hole, and the second mounting hole, to lock the main reduction gear and the housing base and lock the housing base and the concave sub-housing, so that the housing is fastened to the main reduction gear.

In a possible implementation, a plurality of first mounting holes may be disposed on the housing base, a plurality of second mounting holes are disposed on the concave sub-housing base, and a plurality of third mounting holes are disposed on the main reduction gear, to improve reliability of connections between the main reduction gear and the housing base and between the housing base and the concave sub-housing.

In a possible implementation, both the first mounting hole and the third mounting hole are bolt-through holes, and the second mounting hole is a threaded hole.

In a possible implementation, the three pin shafts are of an integrally formed structure. The three pin shafts are set as the integrally formed structure, to improve structural strength of the three pin shafts, and improve the bearing capability of the differential.

In a possible implementation, the housing includes a housing base and a concave sub-housing that are connected along the axial direction of the housing, the housing base includes a housing base plate and an annular sub-housing that is fastened to the housing base plate and that faces a side of the concave sub-housing, an end that is of the annular sub-housing and that is away from the housing base plate is fixedly connected to the concave sub-housing, an end that is of the annular sub-housing and that faces the concave sub-housing has a first groove, an end that is of the concave sub-housing and that faces the housing base has a second groove, and the first groove and the second groove together constitute the window. A part of the window is located in the housing base, and the other part of the window is located in the concave sub-housing. A division position of the housing may be set based on an internal structure of the differential, so that it is more convenient for assembly and dismounting of the differential.

In a possible implementation, an end that is of the annular sub-housing and that faces the concave sub-housing has a first holddown groove, an end that is of the concave sub-housing and that faces the housing base has a second holddown groove, and the first holddown groove and the second holddown groove together constitute a pin shaft mounting hole. The differential further includes the pin shafts, ends of the pin shafts are fastened in the pin shaft mounting holes, and the planetary gears are sleeved on the pin shafts. The housing is divided into the housing base and the concave sub-housing at the pin shaft mounting holes, to ensure that the three pin shafts can be successfully mounted on the three pin shaft mounting holes, so that it is more convenient for assembly of the differential.

In a possible implementation, an end that is of the annular sub-housing and that faces the concave sub-housing has a first holddown groove, and an end that is of the concave sub-housing and that faces the housing base has a second holddown groove. The first holddown groove and the second holddown groove together constitute a pin shaft mounting hole. The window is disposed on the concave sub-housing. No groove is disposed on the housing base body and the window is directly disposed on the concave sub-housing.

In a possible implementation, a first connecting hole is disposed on the annular sub-housing, and a second connecting hole is disposed on the concave sub-housing. A first connecting bolt is further disposed on the differential, and the first connecting bolt sequentially passes through the second connecting hole and the first connecting hole, to lock the housing base and the concave sub-housing.

In a possible implementation, a second connecting bolt is further disposed on the differential, and a first mounting hole is further disposed on the housing base plate. The second connecting bolt passes through the first mounting hole, to lock the housing base and the main reduction gear.

In a possible implementation, the differential further includes two side gear gaskets, where the side gear gaskets are located between the side gears and the side gear mounting surfaces along the axial direction of the housing, and the two side gears are respectively mounted on the two side gear mounting surfaces in cooperation with the two side gear gaskets. The side gear gaskets may be used to adjust a distance between the two side gears, to ensure that the two side gears and the planetary gears can be in a good meshing state. In addition, the side gear gaskets are usually gaskets with a smooth surface and good wear resistance, for example, metal gaskets. The side gear gaskets may be disposed, so that the side gears may rotate more smoothly, and wear of the side gears on the side gear mounting surfaces may be reduced. When the side gear gaskets are worn, only the side gear gaskets may be replaced without replacing the housing. This reduces costs and improves the reliability and the service life of the differential.

In a possible implementation, the differential further includes three planetary gear gaskets, where the planetary gear gaskets are located between the planetary gears and the planetary gear mounting surfaces along an axial direction of the planetary gears, and the three planetary gears are respectively mounted on the three planetary gear mounting surfaces in cooperation with the three planetary gear gaskets. The planetary gear gaskets may be used to adjust a distance between the planetary gears and the side gears, to ensure that the planetary gears and the side gears can be in a good meshing state. In addition, the planetary gear gaskets are usually gaskets with a smooth surface and good wear resistance. The planetary gear gaskets may be disposed, so that the planetary gears may rotate more smoothly, and wear of the planetary gears on the planetary gear mounting surfaces may be reduced. When the planetary gear gaskets are worn, only the planetary gear gaskets may be replaced without replacing the housing. This reduces the costs and improves the reliability and the service life of the differential.

According to a second aspect, this application provides a powertrain. The powertrain includes an oil line system, a power source, a main reduction gear, and the differential according to any one of the foregoing possible implementations, where the main reduction gear is fixedly connected to a housing of the differential, the power source is in transmitted connection to the main reduction gear to power the main reduction gear, and the oil line system can transport coolant oil into the housing through a window to cool or lubricate a component inside the housing.

According to a third aspect, this application provides a vehicle. The vehicle includes a vehicle body and the foregoing powertrain, where the powertrain is mounted on the vehicle body; or the vehicle includes a vehicle body and the differential according to any one of the foregoing possible implementations, where the differential is mounted on the vehicle body.

In this application, by disposing three planetary gears are disposed, so that not only the bearing capability of the differential can be improved, but also the window can be disposed in cooperation in the housing, and active lubrication and cooling of the differential can be implemented through the window, to reduce the wear of the differential, preventing the damage caused by the excessively high temperature of the differential, improve the service life of the differential, and ensure the secure operation of the differential.

BRIEF DESCRIPTION OF DRAWINGS

To describe technical solutions in embodiments of this application more clearly, the following describes the accompanying drawings used in embodiments of this application.

DESCRIPTION OF EMBODIMENTS

Figure 1:
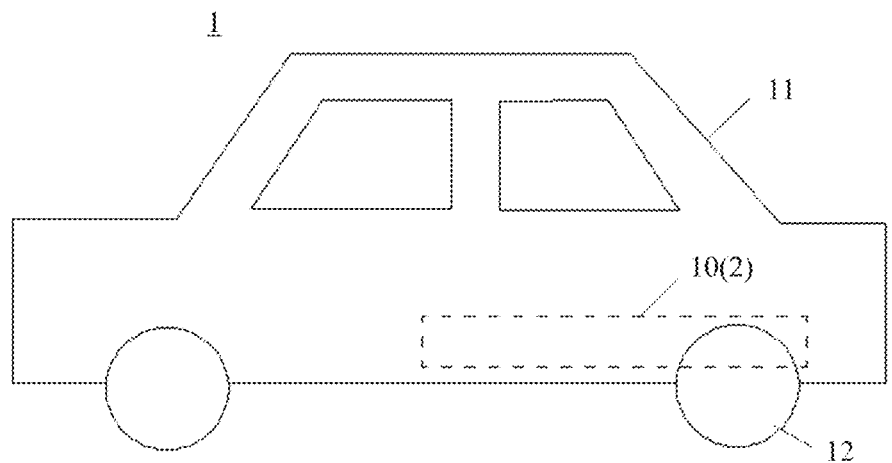
FIG. 1 is a schematic diagram of a vehicle according to an embodiment of this application.

The following describes the technical solutions in embodiments of this application with reference to the accompanying drawings in embodiments of this application. It is clearly that the described embodiments are merely some rather than all of embodiments of this application.

The terms "first", "second", and the like in this specification are merely intended for a purpose of description, and shall not be understood as an indication or implication of relative importance or implicit indication of a quantity of indicated technical features. Therefore, a feature limited by "first" or "second" may explicitly or implicitly include one or more features. In descriptions of this application, unless otherwise stated, "a plurality of" means two or more than two.

In addition, in this specification, position terms such as "top" and "bottom" are defined relative to positions of structures in the accompanying drawings. It should be understood that these position terms are relative concepts used for relative description and clarification, and may correspondingly change according to changes in the positions of the structures.

In embodiments of this application, a differential includes a housing, three planetary gears, two side gears, and at least one window. The differential is configured to receive, through a main reduction gear, power transmitted by a power source and drive two drive shafts. The housing is configured to be fixedly connected to the main reduction gear, and the housing can rotate around an axial direction of the housing under a drive of the main reduction gear. Each of the three planetary gears is mounted on an inner wall of the housing through a pin shaft, and the three planetary gears are disposed spaced from each other along a circumferential direction of the housing. In embodiments of this application, the circumferential direction of the housing is a direction of rotation of the housing. The two side gears are disposed on two sides of the three planetary gears along the axial direction of the housing, and each side gear is meshed with the three planetary gears. The at least one window is used for inflow or outflow of coolant, and each window penetrates through the housing and is located between axes of two adjacent planetary gears. The main reduction gear drives the housing to rotate around the axial direction of the housing, so that the three planetary gears drive the two side gears to drive the two drive shafts respectively. In addition, the coolant may flow into or out of the housing of the differential through the at least one window to lubricate or cool the three planetary gears and the two side gears.

It may be understood that, the three planetary gears in the differential provided in this application can provide a good bearing capability, the at least one window in the differential can be used for cooling and lubrication, and the window in the differential is located between two adjacent planetary gear mounting surfaces, so that a volume of the housing of the differential can be reduced, thereby meeting requirements of the bearing capability, a cooling effect, and volume miniaturization.

Figure 2:
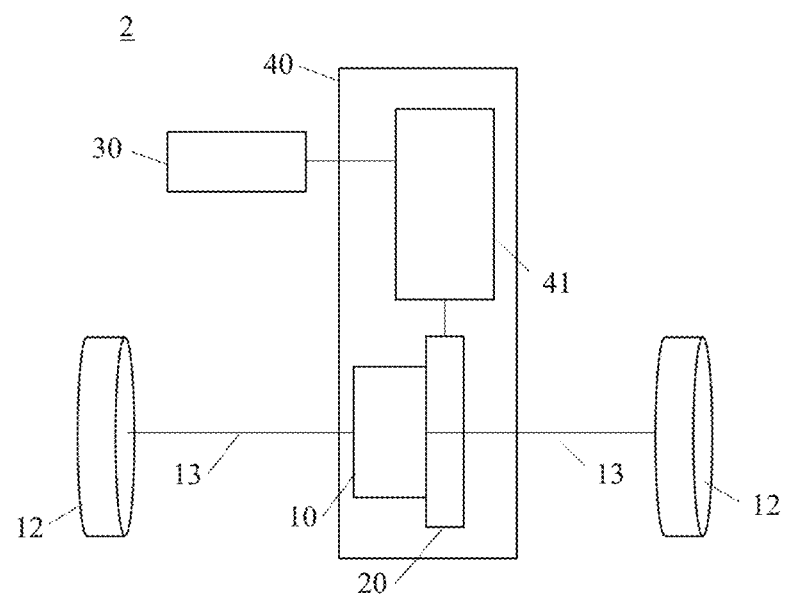
FIG. 2 is a schematic diagram of a powertrain according to an embodiment of this application.

Refer to FIG. 1 and FIG. 2. FIG. 1 is a schematic diagram of a vehicle 1 according to an embodiment of this application. FIG. 2 is a schematic diagram of a powertrain 2 according to an embodiment of this application. A differential 10 in this application may be used in the vehicle 1 or the powertrain 2; or a differential 10 in this application may be used in the vehicle 1, and the powertrain 2 can power the vehicle 1.

The vehicle 1 is a wheeled vehicle that is driven or pulled by a power apparatus and that is used by a person traveling on a road or used to transport articles and perform a special engineering operation. The vehicle 1 includes a vehicle, a robot, or another form of driving device. The vehicle 1 includes a three-wheeled or four-wheeled vehicle. The vehicle 1 includes a car, an off-road vehicle, a bus, a truck, and the like. The vehicle 1 alternatively includes various special operation vehicles with specific functions, for example, an engineering rescue vehicle, a sprinkling truck, a sewage truck, a cement mixer truck, a crane truck, a medical vehicle, and the like. The vehicle may alternatively be an electric vehicle or a fuel vehicle, where the electric vehicle may be, but is not limited to, a pure electric vehicle/battery electric vehicle (PEV/BEV), a hybrid electric vehicle (HEV), a range extended electric vehicle (REEV), a plug-in hybrid electric vehicle (PHEV), or a new energy vehicle. This is not limited in this application.

The vehicle 1 includes a vehicle body 11 (as shown in FIG. 1), and the differential 10 or the powertrain 2 is mounted on the vehicle body 11. The vehicle 1 further includes wheels 12 and drive shafts 13 (as shown in FIG. 2) that are mounted on the vehicle body 11. The differential 10 is in transmitted connection to the drive shafts 13, and the wheels 12 are in transmitted connection to the drive shafts 13. Power generated by the powertrain 2 can be sequentially transferred to the drive shafts 13 and the wheels 12 to enable the vehicle to run. The differential 10 can enable left and right (or front and rear) drive shafts 13 to rotate at different rotation speeds, so that left and right (or front and rear) wheels 12 can rotate at different rotation speeds. When the vehicle 1 turns or travels on an uneven road surface, the left and right (or front and rear) wheels 12 roll at different rotation speeds, to ensure that the wheels 12 perform pure rolling motion. There may be two, three, or more wheels 12 of the vehicle 1. This is not limited in this application.

In an implementation, the vehicle 1 may include one or more differentials 10, or the vehicle 1 includes one or more powertrains 2. This is not limited in this application.

Refer to FIG. 2. The powertrain 2 includes an oil line system (not shown in the figure), a power source 30, a main reduction gear 20, and the differential 10. The main reduction gear 20 is fixedly connected to a housing of the differential 10, the power source 30 is in transmitted connection to the main reduction gear 20 to power the main reduction gear 20, and the oil line system can transport coolant oil into the differential 10 to cool or lubricate a component such as a gear and a bearing in the differential 10.

The power source 30 may be an engine or a driving motor. The engine may be a gasoline engine or a diesel engine. In some implementations, the driving motor includes an asynchronous motor and a synchronous motor. The synchronous motor includes a permanent magnet synchronous motor, a reluctance synchronous motor, and a hysteresis synchronous motor. The asynchronous motor includes an induction motor and an alternating current commutator motor. In some implementations, the induction motor may be divided into a three-phase asynchronous motor, a single-phase asynchronous motor, a shaded-pole asynchronous motor, and the like. In some implementations, the alternating current commutator motor may be divided into a single-phase series motor, an alternating current/direct current universal motor, and a repulsion motor.

In an implementation, the powertrain 2 further includes a gearbox 40 (as shown in FIG. 2). A gear assembly 41 in the gearbox 40 receives power transmitted by the power source 30 and transports the power to the main reduction gear 20. In an implementation, the main reduction gear 20 and the differential 10 may be integrated into a housing of the gearbox 40. The main reduction gear 20 is in transmitted connection to the gear assembly 41 in the gearbox 40. Power output by the power source 30 is transmitted to the main reduction gear 20 and the differential 10 through the gear assembly 41. The oil line system can cool and lubricate the gearbox 40 and the differential 10. The gear assembly 41 may be disposed as required, and may be a single-stage deceleration gear assembly, a two-stage deceleration gear assembly, or a multi-stage deceleration gear assembly.

When the powertrain 2 is in operation, power output by the power source 30 can be transferred to the main reduction gear 20. Rotation of the main reduction gear 20 can drive the differential 10 to rotate. When the differential 10 rotates, heat is generated, so that a temperature of the differential 10 increases, and a high temperature affects performance of the differential 10. If the differential 10 is not dissipated in time, the differential 10 is damaged due to an excessively high temperature, and working efficiency of the powertrain 2 is reduced. In addition, components including a plurality of gears, a gear shaft, a bearing, and the like are disposed inside the differential 10. When the differential 10 is in operation, components that are in contact with each other or coupled to each other generate heat through friction, for example, the gear shaft and a gear in rotating connection to the gear shaft. When the gear rotates relatively to the gear shaft, the gear and the gear shaft rub against each other and cause wear. Serious wear of the components in the differential 10 easily causes damage to the differential 10.

In this application, the differential 10 is improved, so that the coolant oil can be effectively transported inside the differential 10, and the components in the differential 10 are cooled and lubricated, thereby ensuring normal and secure operation of the differential 10.

The following describes in detail the differential 10 in this application.

Figure 3:
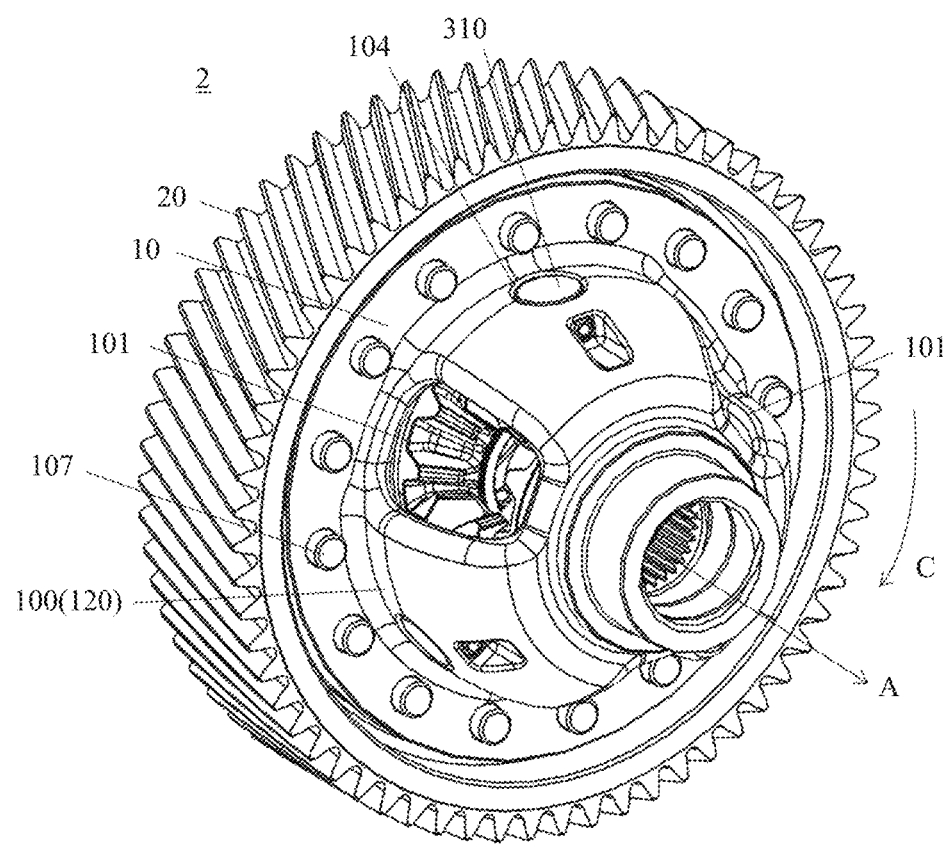
FIG. 3 is a schematic diagram of a differential and a main reduction gear according to a first embodiment of this application.
Figure 4:
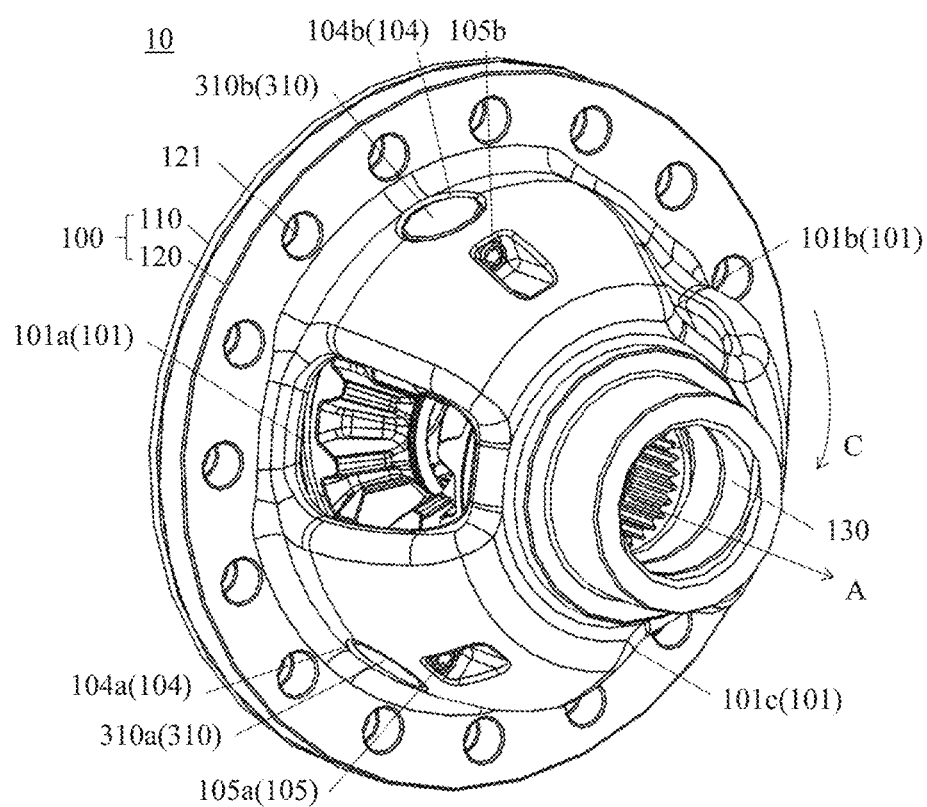
FIG. 4 is a schematic diagram of a structure of a differential according to a first embodiment of this application.
Figure 5:
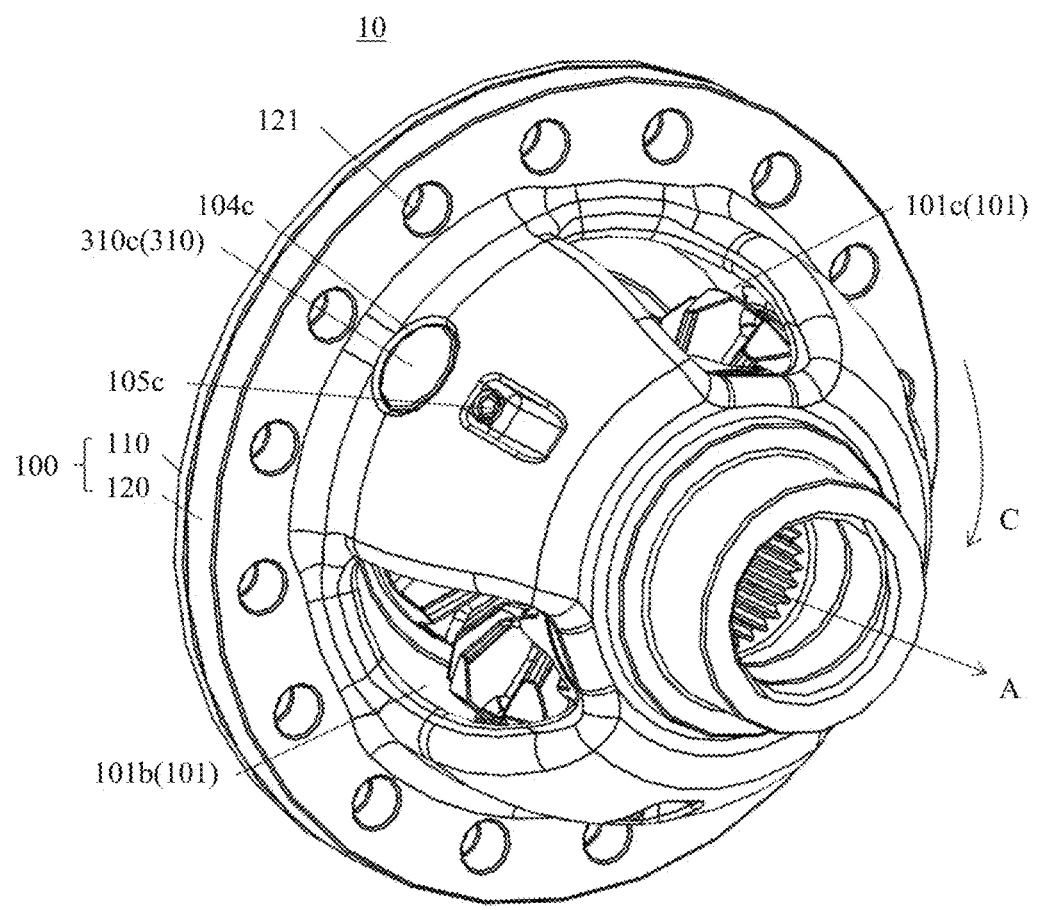
FIG. 5 is a schematic diagram of a structure of a differential according to a first embodiment of this application.
Figure 6:
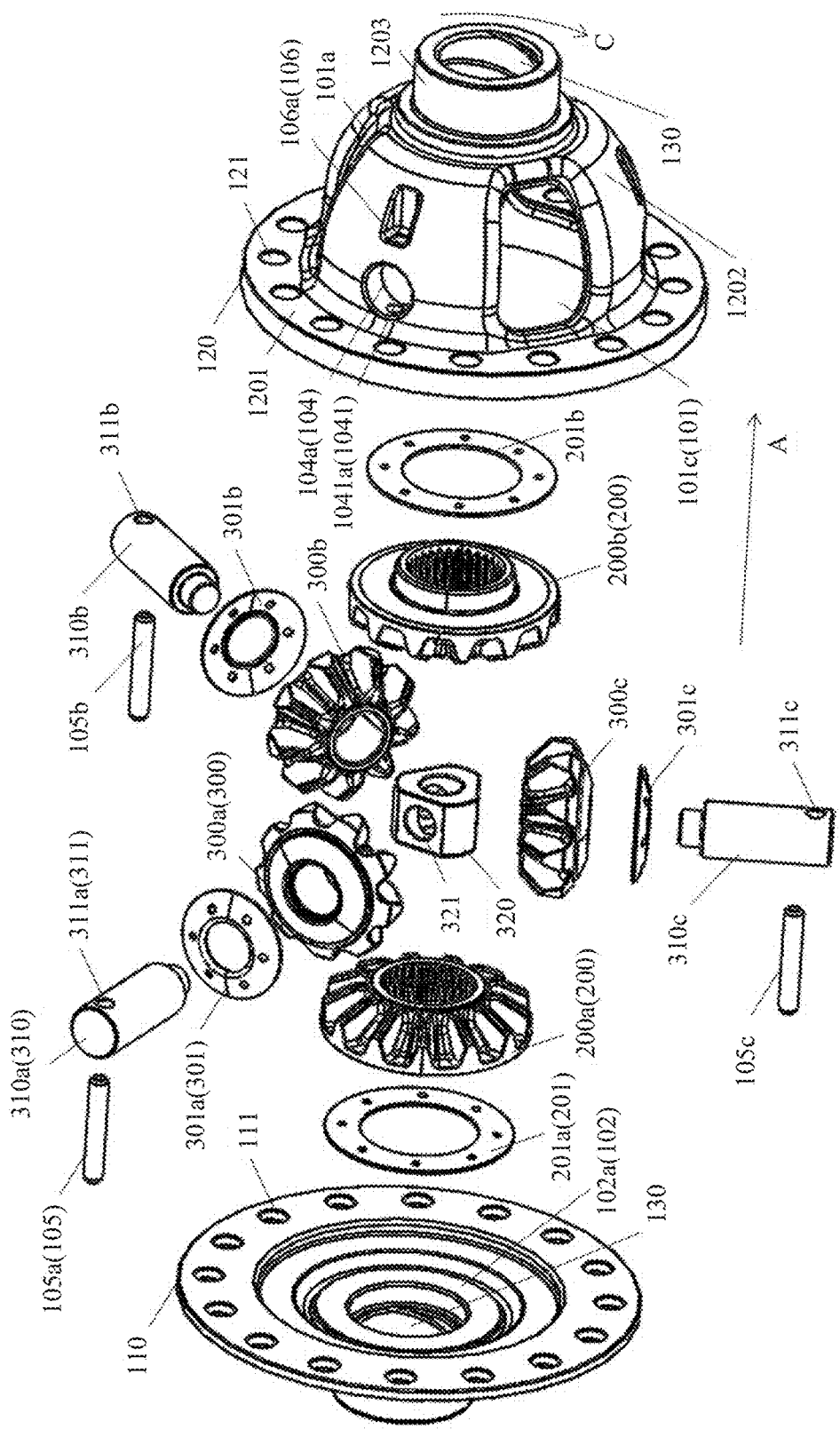
FIG. 6 is an exploded diagram of a differential according to a first embodiment of this application.

Refer to FIG. 3, FIG. 4, FIG. 5, and FIG. 6. FIG. 3 is a schematic diagram of the differential 10 and the main reduction gear 20 according to a first embodiment of this application. FIG. 4 is a schematic diagram of a structure of the differential 10 according to the first embodiment of this application. FIG. 5 is a schematic diagram of the structure of the differential 10 according to the first embodiment of this application. FIG. 4 and FIG. 5 are schematic diagrams of the structure of the differential 10 shown from different angles. FIG. 6 is an exploded diagram of the differential 10 according to the first embodiment of this application.

The first embodiment of this application provides the differential 10. The differential 10 includes a housing 100, two side gears 200, three planetary gears 300, and at least one window 101. The differential 10 is configured to receive, through a main reduction gear 20, power transmitted by a power source and drive two drive shafts 13. The housing 100 is configured to be fixedly connected to the main reduction gear 20, and the housing 100 can rotate around an axial direction A of the housing 100 under a drive of the main reduction gear 20. The three planetary gears 300 are separately mounted on an inner wall of the housing 100 through pin shafts 310 and disposed spaced from each other along a circumferential direction C of the housing 100, and the circumferential direction C of the housing 100 is a direction of rotation of the housing 100. The two side gears 200 are disposed on two sides of the three planetary gears 300 along the axial direction A of the housing 100, and each side gear 200 is meshed with the three planetary gears 300. The at least one window 101 is used for inflow or outflow of coolant, and the window 101 penetrates through the housing 100 and is located between axes of two adjacent planetary gears 300. The main reduction gear 20 drives the housing 100 to rotate around the axial direction A of the housing 100, so that the three planetary gears 300 drive the two side gears 200 to drive the two drive shafts 13 respectively (as shown in FIG. 2). In addition, the coolant may flow into or out of the housing 100 of the differential 10 through the at least one window 101 to lubricate or cool the three planetary gears 300 and the two side gears 200.

The circumferential direction C of the housing 100 is also a circumferential direction of the side gears 200, and the axial direction A of the housing 100 is also an axial direction of the side gears 200. The housing 100 is fastened to the main reduction gear 20, and the housing 100 can rotate with the main reduction gear 20 to receive power transmitted by the main reduction gear 20. The housing 100 is provided with accommodation space, and the accommodation space is used to accommodate components such as the side gears 200 and the planetary gears 300.

In an implementation, the housing 100 is provided with two perforations 130 (as shown in FIG. 6) in the axial direction A, and the two drive shafts 13 extend into the housing 100 from outside of the housing 100 through the two perforations 130, and are in transmitted connection to the two side gears 200. The window 101 is disposed on the housing 100, and the window 101 is located between the two perforations 130. The coolant can enter inside the housing 100 through the window 101 to cool components such as the side gears 200 and the planetary gears 300 inside the differential 10. In an implementation, the coolant includes coolant oil, and the coolant oil can enter inside the housing 100 through the window 101, to cool the components inside the differential 10 and ensure that the differential 10 is fully lubricated in an operation process.

The two side gears 200 are 200a and 200b shown in FIG. 6. The side gear 200a and the side gear 200b are disposed spaced from each other along the axial direction A. The two drive shafts 13 extend into the housing 100 from the outside of the housing 100 and are respectively fixedly connected to the two side gears 200. Rotation of the side gears 200 can drive the drive shafts 13 to rotate. Meshing gears of the side gear 200a and the side gear 200b are disposed oppositely to each other and are bevel gears, so that the planetary gears 300 can be meshed between the side gear 200a and the side gear 200b.

The three planetary gears 300 are 300a, 300b, and 300c shown in FIG. 6. The three planetary gears 300 are fastened on an inner side of the housing 100. When the housing 100 rotates, the three planetary gears 300 can revolve with the housing 100 along the axial direction A of the housing 100. In addition, the three planetary gears 300 can also revolve on axes of the three planetary gears 300, relative to the housing 100, along an axial direction of the planetary gears 300. The planetary gear 300a is meshed with both the side gear 200a and the side gear 200b, the planetary gear 300b is meshed with both the side gear 200a and the side gear 200b, and the planetary gear 300c is meshed with both the side gear 200a and the side gear 200b. The three planetary gears 300 and the two side gears 200 are all bevel gears, so that the three planetary gears 300 can be meshed with the two side gears 200. When the three planetary gears 300 revolve, the two side gears 200 can be pushed to rotate around the axial direction A of the housing 100. When a rotation speed of one of the side gears 200 is greater than a rotation speed of the other side gear 200, the side gears 200 drives the planetary gears 300 to revolve on axes of the planetary gears 300 and absorb a different speed between the two side gears 200, so that the two side gears 200 rotate at a different speed.

In an implementation, the three planetary gears 300 have a same structure size. In some implementations, the three planetary gears 300 may also have a slight difference in structure sizes when a process error is allowed.

In the implementation shown in FIG. 6, when the vehicle 1 runs in a straight line, the housing 100 rotates along the circumferential direction C, and the three planetary gears 300 revolve with the housing 100 along the circumferential direction C to drive the two side gears 200 to rotate along the circumferential direction C. In this case, the three planetary gears 300 do not revolve on axes of the three planetary gears 300, and the two side gears 200 rotate at a same speed. When the vehicle 1 turns, the three planetary gears 300 revolve with the housing 100 along the circumferential direction C. In addition, because left and right wheels 12 are subject to inconsistent resistance, and the left and right drive shafts 13 are subject to different forces, the three planetary gears 300 revolve on axes of the three planetary gears 300, and the two side gears 200 generate a rotating speed difference, so that the vehicle 1 turns smoothly.

Figure 7:
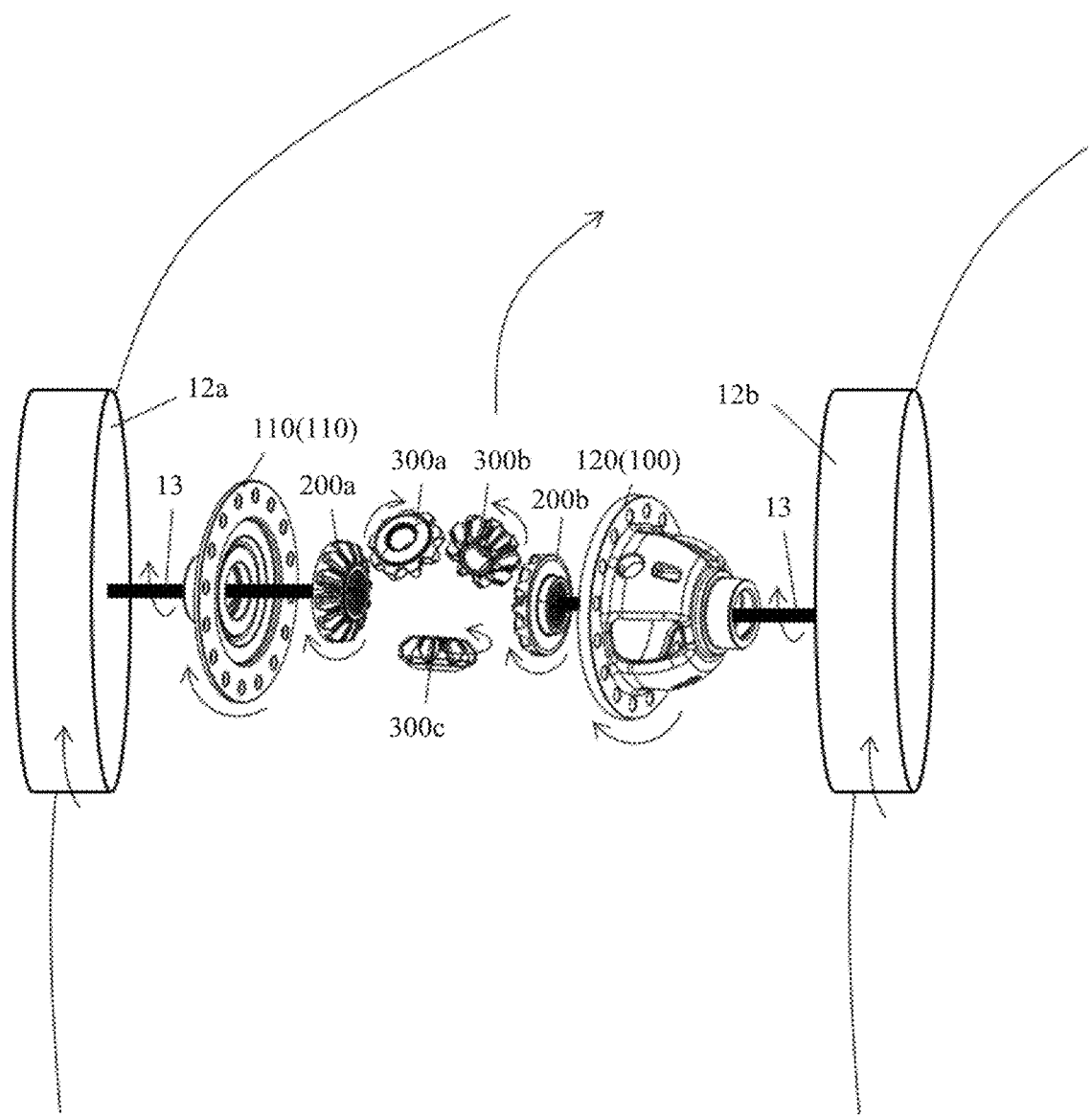
FIG. 7 is a schematic diagram of a right turn of a vehicle according to a first embodiment of this application.

FIG. 7 is a schematic diagram of a right turn of a vehicle 1 according to a first embodiment of this application. When the vehicle 1 turns right, a rotation speed of a left side gear 200a is greater than a rotation speed of a right side gear 200b, and a resistance difference between a left wheel 12a and a right wheel 12b enables a planetary gear 300a to rotate clockwise, a planetary gear 300b to rotate counter-clockwise, and a planetary gear 300c to rotate counter-clockwise. In this way, the left side gear 200a and the right side gear 200b can rotate at a different speed, the left wheel 12a rotates faster than the right wheel 12b, and the vehicle 1 can turn smoothly.

If four planetary gears 300 are disposed, although the four planetary gears 300 have a good bearing capability, a fitting area between the four planetary gears 300 and the housing 100 is large, and the window 101 cannot be disposed on the housing 100. The housing 100 is of a completely closed structure, and coolant oil cannot be sprayed to the housing 100 for active lubrication. The coolant oil cannot pass through the housing 100 and enter inside the housing 100 to implement cooling and lubrication of a differential 10. If only two planetary gears 300 are disposed, although there is plenty of space on the housing 100 for disposing the window 101, a bearing capability of the differential 10 is poor when only two planetary gears 300 are disposed. When the vehicle 1 is in an extreme or strict differential working condition, the differential 10 is easily damaged.

However, in this implementation, three planetary gears 300 are disposed, so that not only the bearing capability of the differential 10 can be improved, but also the window 101 can be disposed in cooperation in the housing 100, and active lubrication and cooling of the differential 10 can be implemented through the window 101, to reduce wear of the differential 10, prevent the differential 10 from being damaged due to an excessively high temperature, improve a service life of the differential 10, and ensure secure operation of the differential 10. In addition, the window 101 in the differential 10 is located between the two adjacent planetary gears 300, so that a volume of the housing 100 of the differential 10 can be reduced, thereby meeting requirements of the bearing capability, a cooling effect, and volume miniaturization.

Figure 9:
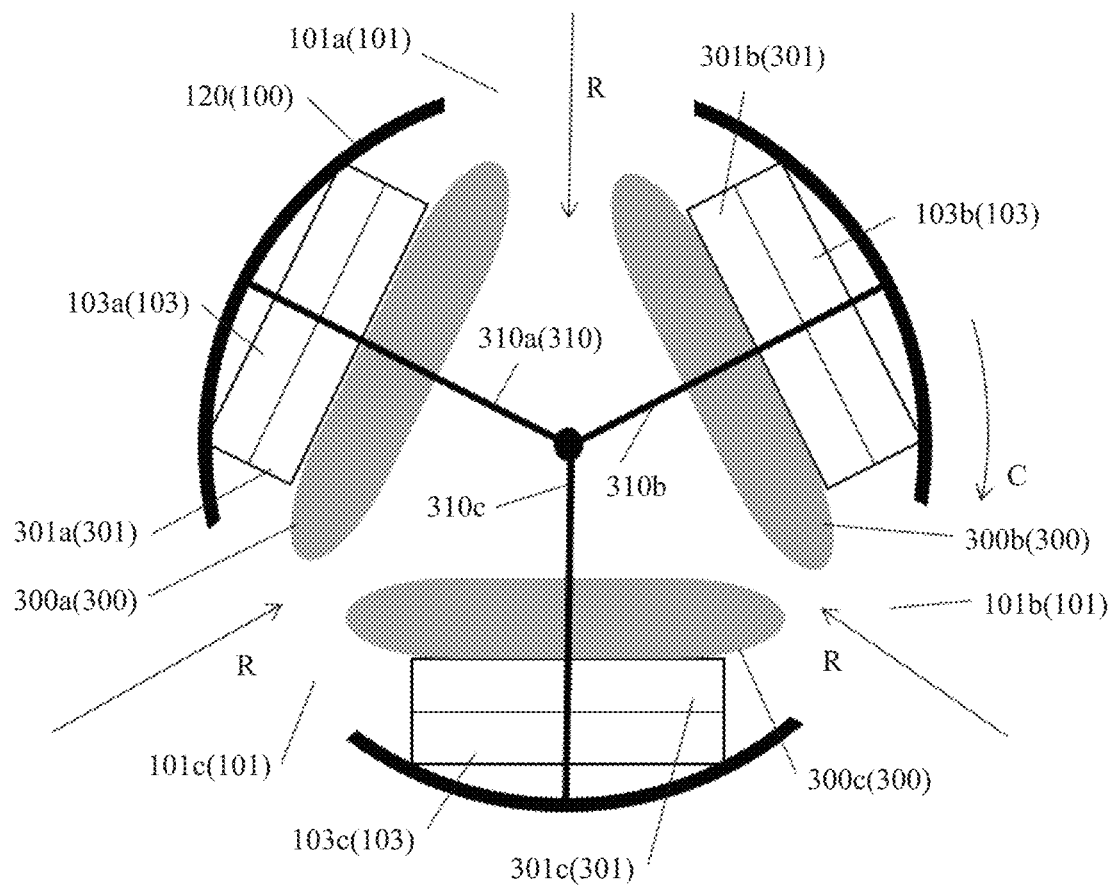
FIG. 9 is a schematic diagram of a differential according to a first embodiment of this application.

Refer to FIG. 6 and FIG. 9. In this embodiment, in the circumferential direction C of the housing 100, the window 101 is located between axes of two adjacent planetary gears 300. In this way, the window 101 does not interfere with mounting of the planetary gears 300, and the housing 100 has higher structural strength and a stronger bearing capability. In addition, the housing 100 has large space between the axes of the two planetary gears 300, and the space may be used to dispose the window 101. A larger area of the window 101 makes it easier for coolant oil to lubricate and dissipate heat for an internal component of the differential 10 through the window 101.

Figure 8:
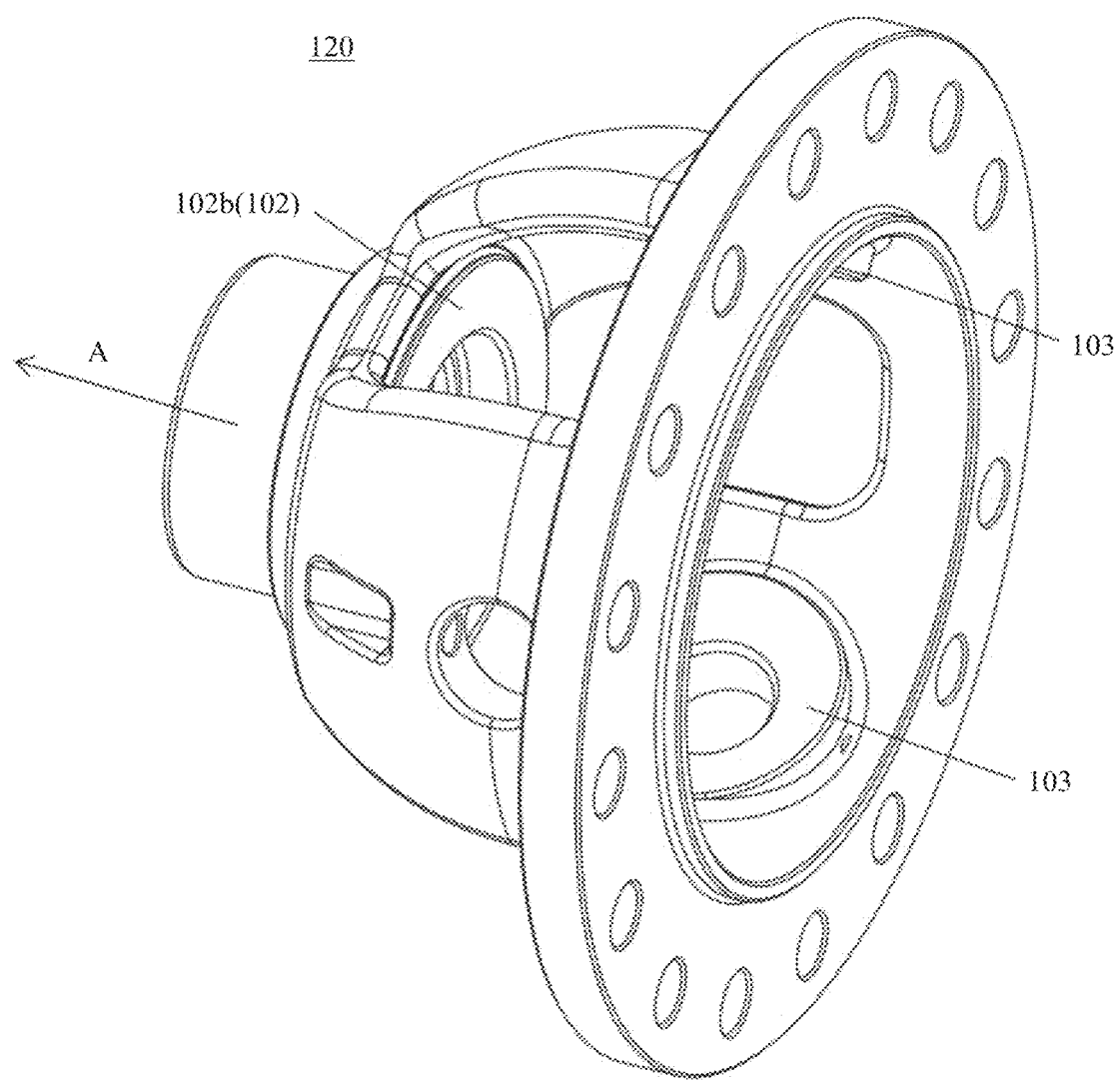
FIG. 8 is a schematic diagram of a structure of a concave sub-housing according to a first embodiment of this application.

In a possible implementation, an inner surface of the housing 100 has three planetary gear mounting surfaces 103 (as shown in FIG. 6, FIG. 8, and FIG. 9) disposed spaced from each other along the circumferential direction C of the housing 100, the three planetary gear mounting surfaces 103 are respectively used to mount the three planetary gears 300, and the window 101 is located between two adjacent planetary gear mounting surfaces 103. The three planetary gear mounting surfaces 103 are 103a, 103b, and 103c shown in FIG. 9. The planetary gears 300 are fastened in the housing 100 through the planetary gear mounting surfaces 103, and the mounting areas are disposed, so that the planetary gears 300 are in a good meshing state with the side gears 200. The window 101 is located between the two adjacent planetary gear mounting surfaces 103, so that the window 101 does not interfere with mounting of the planetary gears 300. The planetary gear mounting surfaces 103 are force-bearing parts of the planetary gears 300, and the window 101 is disposed away from the planetary gear mounting surfaces 103, so that the housing 100 has higher structural strength and a stronger bearing capability. In addition, the housing 100 between the two planetary gear mounting surfaces 103 has large space while high strength of the housing 100 is ensured, and the space may be used to dispose the window 101. A larger area of the window 101 makes it easier for the coolant oil to lubricate and dissipate heat for the internal component of the differential 10 through the window 101.

In a possible implementation, the planetary gear mounting surfaces 103 protrude inwardly from the inner surface of the housing 100. The planetary gear mounting surfaces 103 protrude inwardly, so that the planetary gears 300 are disposed away from an inner wall of the housing 100, to prevent the planetary gears 300 from contacting with and rubbing against another inner wall of the housing 100 when the planetary gears 300 rotate, so that the planetary gears 300 rotates more smoothly.

In a possible implementation, two side gear mounting surfaces 102 (as shown in FIG. 6, FIG. 8, and FIG. 9) disposed oppositely to each other along the axial direction A of the housing 100 are disposed on the inner surface of the housing 100, the two side gear mounting surfaces 102 are respectively used to mount the two side gears 200, and the window 101 is located between two adjacent side gear mounting surfaces 102. The two side gear mounting surfaces 102 are 102a shown in FIGS. 6 and 102b shown in FIG. 8, the drive shafts 13 may be fixedly connected to the side gears 200 through the side gear mounting surfaces 102, and the mounting areas are disposed, so that the side gears 200 are in a good meshing state with the planetary gears 300.

In an implementation, the differential 10 further includes two side gear gaskets 201. As shown in 201a and 201b in FIG. 6, the side gear gaskets 201 are located between the side gears 200 and the side gear mounting surfaces 102 along the axial direction A of the housing 100. For example, the side gear gasket 201a is located between the side gear 200a and the side gear mounting surface 102a, and the two side gears 200 are respectively mounted on the two side gear mounting surfaces 102 in cooperation with the two side gear gaskets 201. The side gear gaskets 201 may be used to adjust a distance between the two side gears 200, to ensure that the two side gears 200 and the planetary gears 300 can be in a good meshing state. In addition, the side gear gaskets 201 are usually gaskets with a smooth surface and good wear resistance, for example, metal gaskets. The side gear gaskets 201 may be disposed, so that the side gears 200 may rotate more smoothly, and wear of the side gears 200 on the side gear mounting surfaces 102 may be reduced. When the side gear gaskets 201 are worn, only the side gear gaskets 201 may be replaced without replacing the housing 100. This reduces costs and improves reliability and a service life of the differential 10.

In an implementation, the differential 10 further includes three planetary gear gaskets 301. As shown in 301a, 301b, and 301c in FIG. 6, the planetary gear gaskets 301 are located between the planetary gears 300 and the planetary gear mounting surfaces 103 along an axial direction of the planetary gears 300, and the three planetary gears 300 are respectively mounted on the three planetary gear mounting surfaces 103 in cooperation with the three planetary gear gaskets 301. The planetary gear gaskets 301 may be used to adjust a distance between the planetary gears 300 and the side gears 200 to ensure that the planetary gears 300 and the side gears 200 can be in a good meshing state. In addition, the planetary gear gaskets 301 are usually gaskets with a smooth surface and good wear resistance. The planetary gear gaskets 301 may be disposed, so that the planetary gears 300 may rotate more smoothly, and wear of the planetary gears 300 on the planetary gear mounting surfaces 103 may be reduced. When the planetary gear gaskets 301 are worn, only the planetary gear gaskets 301 may be replaced without replacing the housing 100. This reduces the costs and improves the reliability and the service life of the differential 10.

In a possible implementation, a ratio of a total area of the at least one window 101 to a surface area of the housing 100 is greater than or equal to ⅓. A larger area of the window 101 makes it easier for the coolant oil to lubricate and dissipate heat for the internal component of the differential 10 through the window 101. A ratio of a total area of all windows 101 to the surface area of the housing 100 is set to be greater than or equal to ⅓, to ensure that the differential 10 can be fully lubricated and cooled, and improve the reliability of the differential 10. The total area of the at least one window 101 is a sum of opening areas of all the windows 101. For example, when there is one window 101, the total area is an opening area of the window 101; and when there are three windows 101, the total area is a sum of opening areas of the three windows 101.

In an implementation, the ratio of the total area of the at least one window 101 to the surface area of the housing is greater than or equal to ½. In a possible implementation, the ratio of the total area of the at least one window 101 to the surface area of the housing 100 may alternatively be less than ⅓ when a cooling effect is not required to be high.

To ensure lubrication and cooling effects of the coolant oil on the differential 10, a plurality of windows 101 may be disposed on the housing 100 and an area of each window 101 may be increased. In an implementation, a window 101 with a large area may be disposed between the axes of the two planetary gears 300 on the housing 100, or a plurality of windows 101 may be disposed.

Refer to FIG. 9. In a possible implementation, the at least one window 101 includes three windows 101, and the three windows 101 and the three planetary gears 300 are disposed in an alternating sequence in the circumferential direction C of the housing 100. The three windows 101 are disposed on the housing 100. In the circumferential direction C, one window 101 is disposed between every two adjacent planetary gears 300.

In an implementation shown in FIG. 9, a window 101a is disposed between a planetary gear 300a and a planetary gear 300b, a window 101b is disposed between the planetary gear 300b and a planetary gear 300c, and a window 101c is disposed between the planetary gear 300c and the planetary gear 300a. Projection of the window 101a on the housing 100 along a radial R of the side gears 200 overlaps at least partially with projection of the planetary gear 300c on the housing 100 along the radial R, projection of the window 101b on the housing 100 along the radial R overlaps at least partially with projection of the planetary gear 300a on the housing 100 along the radial R, and projection of the window 101c on the housing 100 along the radial R overlaps at least partially with projection of the planetary gear 300b on the housing 100 along the radial R. In this way, the coolant oil entering from the window 101a, the window 101b, and the window 101c may be directly sprayed to the planetary gear 300c, the planetary gear 300a, and the planetary gear 300b respectively, thereby improving a cooling effect of the coolant oil on the differential 10.

Refer to FIG. 6. In a possible implementation, the differential 10 includes pin shafts 310, where one end of each of the three pin shafts 310 is fixedly connected to each other, and the other end of each of the three pin shafts 310 is fastened to the housing 100. The three planetary gears 300 are respectively sleeved on the three pin shafts 310, and the planetary gears 300 can rotate relatively to the pin shafts 310. As shown in FIG. 9, one end of a pin shaft 310a, one end of a pin shaft 310b, and one end of a pin shaft 310c are fixedly connected to each other, and the other end of the pin shaft 310a, the other end of the pin shaft 310b, and the other end of the pin shaft 310c are fixedly connected to the housing 100. The planetary gear 300a, the planetary gear 300b, and the planetary gear 300c are respectively sleeved on the pin shaft 310a, the pin shaft 310b, and the pin shaft 310c. When the housing 100 rotates, the pin shafts 310 can be driven to rotate, thereby driving the planetary gears 300 to rotate. The pin shafts 310 provide a rotating support structure for the planetary gears 300, to improve rotation stability of the planetary gears 300. In addition, the planetary gears 300 are in rotating connection to the pin shafts 310. When the planetary gears 300 rotate relatively to the pin shafts 310, the planetary gears 300 revolve on axes of the planetary gears 300, so that the two side gears 200 rotate at a different speed.

In some implementations, the three pin shafts 310 are in a same plane, and an included angle between two adjacent pin shafts 310 is 120 degrees, or an included angle between two adjacent pin shafts 310 is about 120 degrees if a deviation is within a process error range of 5 degrees. Forces of the three pin shafts 310 may be optimized if the pin shafts 310 are evenly distributed.

In this embodiment, one end of each of the three pin shafts 310 is connected to each other in a dismountable manner.

Refer to FIG. 6. In a possible implementation, the differential 10 further includes a central sleeve ring 320, and one end of each of three pin shafts 310 is fastened to the central sleeve ring 320. Three grooves 321 are disposed on the central sleeve ring 320, and one end of the pin shaft 310a, one end of the pin shaft 310b, and one end of the pin shaft 310c are respectively inserted into the three grooves 321, so that one end of the pin shaft 310a, one end of the pin shaft 310b, and one end of the pin shaft 310c are fastened to the central sleeve ring 320. One end of the pin shaft 310a, one end of the pin shaft 310b, and one end of the pin shaft 310c are connected in a dismountable manner through the central sleeve ring 320. This is beneficial for mounting and dismounting of the pin shafts 310.

Refer to FIG. 4, FIG. 5, and FIG. 6. In a possible implementation, three pin shaft mounting holes 104 are disposed on the housing 100 in the circumferential direction C of the housing 100, and the other ends of three pin shafts 310 are respectively fastened in the three pin shaft mounting holes 104. The three pin shaft mounting holes 104 are 104a and 104b shown in FIGS. 4 and 104c shown in FIG. 5, and the three pin shaft mounting holes 104 respectively penetrate through inner and outer surfaces of the three planetary gear mounting surfaces 103.

Figure 10:
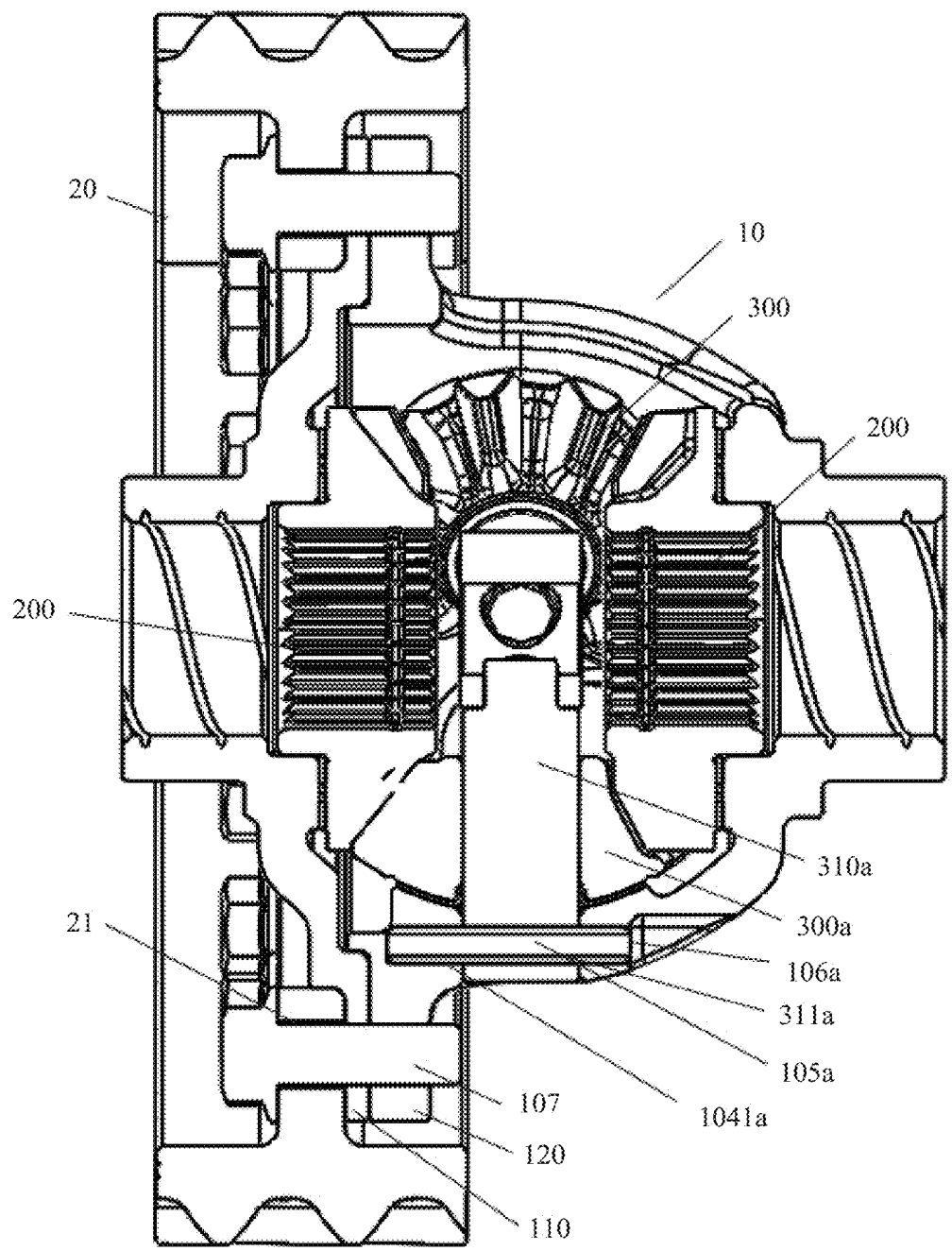
FIG. 10 is a sectional view of a differential according to a first embodiment of this application.

In an implementation, the differential 10 further includes three pin shaft fastened pins 105: 105a, 105b, and 105c shown in FIG. 6. Three pin shaft holes 106 are further disposed on the housing 100, and a hole channel 311 is disposed on each of the three pin shafts 310. As shown in FIG. 6, a hole channel 311a is disposed on the pin shaft 310a, a hole channel 311b is disposed on the pin shaft 310b, and a hole channel 311c is disposed on the pin shaft 310c. Three pin shaft fixing holes 1041 are further disposed on the housing 100, and the three pin shaft fixing holes 1041 are respectively located in the pin shaft mounting holes 104. The pin shaft fastened pins 105 sequentially pass through corresponding pin shaft holes 106, hole channels 311, and the pin shaft fixing holes 1041 along the axial direction A, to fix the other ends of the pin shafts 310 in the pin shaft mounting holes 104. As shown in FIG. 6 and FIG. 10, the pin shaft fastened pin 105a sequentially passes through a pin shaft hole 106a, the hole channel 311a, and a pin shaft fixing hole 1041a along the axial direction A, to fix the other end of the pin shaft 310a in the pin shaft mounting hole 104a. In an implementation in which the pin shafts 310 are fastened outside the housing 100, it is more convenient for dismounting the differential 10.

Refer to FIG. 4, FIG. 5, and FIG. 6. In a possible implementation, in the axial direction A of the side gears 200, at least one of the three pin shaft mounting holes 104 overlaps at least partially with the window 101. At least a part of windows 101 may be disposed along a radial direction R of the side gears 200 to face the pin shafts 310, so that the coolant oil may directly cool the pin shafts 310 and the planetary gears 300 when entering the housing 100 from the window 101 along a radial direction R, to improve the cooling effect on the differential 10.

Refer to FIG. 6. In a possible implementation, the housing 100 includes a housing base 110 and a concave sub-housing 120 that are connected along the axial direction A of the housing 100, and two side gears 200 are respectively mounted on the housing base 110 and the concave sub-housing 120, and the window 101 is located in the concave sub-housing 120. The two side gear mounting surfaces 102 are respectively located in the housing base 110 and the concave sub-housing 120. The three planetary gear mounting surfaces 103 are located on the concave sub-housing 120. The three pin shaft mounting holes 104 and the pin shaft holes 106 are all located in the concave sub-housing 120. The pin shaft holes 106 are located on sides that are of the pin shaft mounting holes 104 and that are away from the housing base 110 along the axial direction A. After the differential 10 is assembled, the three pin shafts 310 are all located in the concave sub-housing 120. In this implementation, the housing base 110 and the concave sub-housing 120 that are connected in a dismountable manner are disposed, so that it is convenient for dismounting and maintenance of the differential 10.

In a possible implementation, the concave sub-housing 120 includes a concave sub-housing base 1201, a concave sub-housing body 1202, and a concave sub-housing top 1203 that are sequentially connected along the axial direction A of the housing 100, and the concave sub-housing base 1201 is fastened to the housing base 110. One of the side gears 200 is mounted on an inner side of the concave sub-housing top 1203, the window 101 is disposed on the concave sub-housing body 1202, and the window 101 separately adjoins the concave sub-housing base 1201 and the concave sub-housing top 1203 along two side walls of the axial direction A of the housing 100.

Refer to FIG. 6 and FIG. 10. In an implementation, a first mounting hole 111 is disposed on a side that is of the housing base 110 and that is close to the concave sub-housing 120, a second mounting hole 121 is disposed on a side that is of the concave sub-housing base 1201 and that is close to the housing base 110, and a third mounting hole 21 is disposed on the main reduction gear 20. A bolt 107 is further disposed on the differential 10, the bolt 107 sequentially passes through the third mounting hole 21 of the main reduction gear 20, the first mounting hole 111 of the housing base 110, and the second mounting hole 121 of the concave sub-housing 120, to lock the main reduction gear 20 and the housing base 110 and lock the housing base 110 and the concave sub-housing 120, so that the housing 100 is fastened to the main reduction gear 20.

In an implementation, a plurality of first mounting holes 111 may be disposed on the housing base 110, a plurality of second mounting holes 121 are disposed on the concave sub-housing base 1201, and a plurality of third mounting holes 21 are disposed on the main reduction gear 20, to improve reliability of connections between the main reduction gear 20 and the housing base 110 and between the housing base 110 and the concave sub-housing 120.

In an implementation, both the first mounting hole 111 and the third mounting hole 21 are bolt-through holes, and the second mounting hole 121 is a threaded hole.

Figure 11:
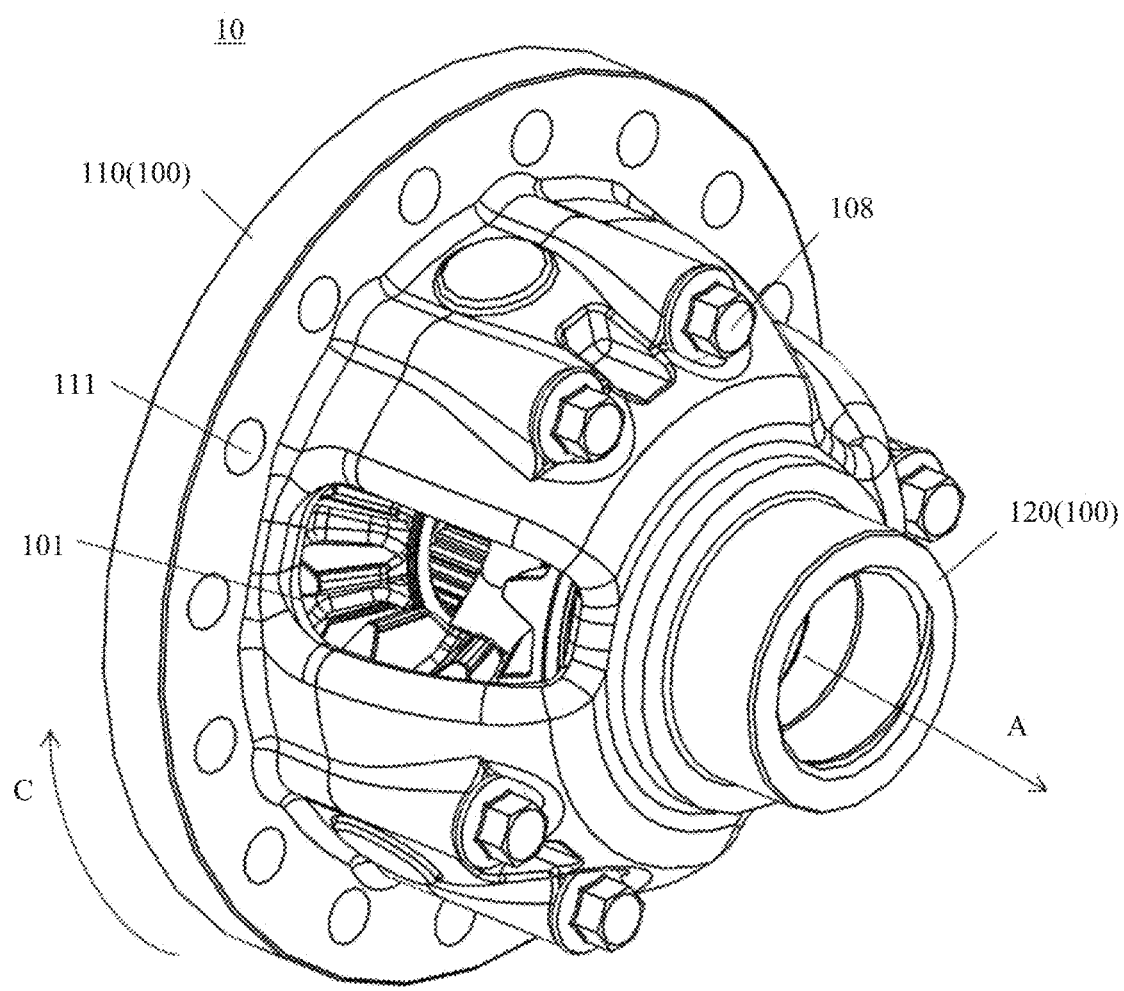
FIG. 11 is a schematic diagram of a structure of a differential according to a second embodiment of this application.
Figure 12:
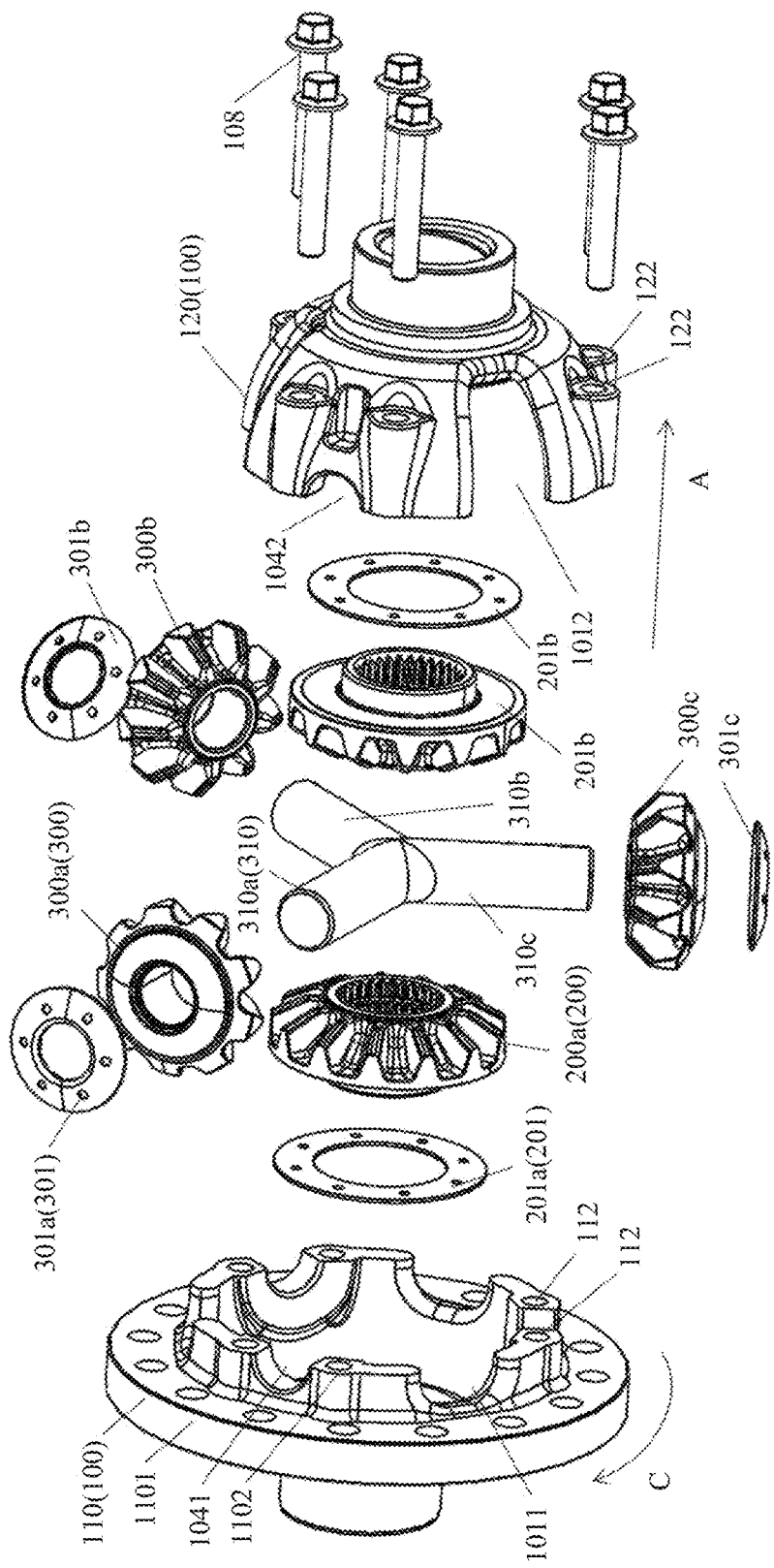
FIG. 12 is an exploded diagram of a differential according to a second embodiment of this application.

Refer to FIG. 11 and FIG. 12. FIG. 11 is a schematic diagram of a structure of the differential 10 according to a second embodiment of this application, and FIG. 12 is an exploded diagram of the differential 10 according to the second embodiment of this application. The second embodiment of this application provides the differential 10. A difference from the first embodiment is that in the second embodiment, three pin shafts 310 are of an integrally formed structure. One end of the pin shaft 310a, one end of the pin shaft 310b, and one end of the pin shaft 310c are fixedly connected to each other and are in a non-dismountable state. In this embodiment, the three pin shafts 310 are set as the integrally formed structure, to improve structural strength of the three pin shafts 310, and improve a bearing capability of the differential 10.

In a possible implementation, the housing 100 includes a housing base 110 and a concave sub-housing 120 that are connected along the axial direction A of the housing 100. The concave sub-housing 120 includes a concave sub-housing base 1201, a concave sub-housing body 1202, and a concave sub-housing top 1203 that are sequentially connected along the axial direction A of the housing 100, and the concave sub-housing base 1201 is fastened to the housing base 110. One of the side gears 200 is mounted on an inner side of the concave sub-housing top 1203, the window 101 is disposed on the concave sub-housing body 1202, and the window 101 separately adjoins the concave sub-housing base 1201 and the concave sub-housing top 1203 along two side walls of the axial direction A of the housing 100.

In a possible implementation, the housing 100 includes a housing base 110 and a concave sub-housing 120 that are connected along the axial direction A of the housing 100, the housing base 110 includes a housing base plate 1101 and an annular sub-housing 1102 that is fastened to the housing base plate 1101 and that faces a side of the concave sub-housing 120, an end that is of the annular sub-housing 1102 and that is away from the housing base plate 1101 is fixedly connected to the concave sub-housing 120, an end that is of the annular sub-housing 1102 and that faces the concave sub-housing 120 has a first groove 1011, an end that is of the concave sub-housing 120 and that faces the housing base 110 has a second groove 1012, and the first groove 1011 and the second groove 1012 together constitute the window 101. A part of the window 101 is located in the housing base 110, and the other part of the window 101 is located in the concave sub-housing 120. A division position of the housing 100 may be set based on an internal structure of the differential 10, so that it is more convenient for assembly and dismounting of the differential 10.

In another implementation, the window 101 may alternatively be disposed only in the concave sub-housing 120. That is, no groove is disposed on the housing base 110, and the window 101 is directly disposed on the concave sub-housing 120.

In a possible implementation, an end that is of the annular sub-housing 1102 and that faces the concave sub-housing 120 has a first holddown groove 1041, and an end that is of the concave sub-housing 120 and that faces the housing base 110 has a second holddown groove 1042. The first holddown groove 1041 and the second holddown groove 1042 together constitute a pin shaft mounting hole 104. The differential 10 further includes the pin shafts 310, ends of the pin shafts 310 are fastened in the pin shaft mounting hole 104, and the planetary gears 300 are sleeved on the pin shafts 310.

Three pin shaft mounting holes 104 are disposed on the housing 100, and a part of each pin shaft mounting hole 104 is located on the housing base 110, and the other part of each pin shaft mounting hole 104 is located in the concave sub-housing 120. In this embodiment, the three pin shafts 310 are of the integrally formed structure. If the housing base 110 and the concave sub-housing 120 shown in FIG. 6 are used, during mounting, the three pin shafts 310 cannot be fastened in the three pin shaft mounting holes 104 at the same time. However, in this embodiment, the housing 100 is divided into the housing base 110 and the concave sub-housing 120 at the pin shaft mounting holes 104, to ensure that the three pin shafts 310 can be successfully mounted on the three pin shaft mounting holes 104, so that it is more convenient for assembly of the differential 10.

In some implementations, an end that is of the annular sub-housing 1102 and that faces the concave sub-housing 120 may alternatively have a first holddown groove 1041, and an end that is of the concave sub-housing 120 and that faces the housing base 110 has a second holddown groove 1042, and the first holddown groove 1041 and the second holddown groove 1042 together constitute a pin shaft mounting hole 104.

Refer to FIG. 12. In an implementation, a first connecting hole 112 is disposed on the annular sub-housing 1102, and a second connecting hole 122 is disposed on the concave sub-housing 120. A first connecting bolt 108 is further disposed on the differential 10, and the first connecting bolt 108 sequentially passes through the second connecting hole 122 and the first connecting hole 112, to lock the housing base 110 and the concave sub-housing 120.

In an implementation, a second connection bolt is disposed on the differential 10, and a first mounting hole 111 is further disposed on the housing base plate 1101. The second connection bolt passes through the first mounting hole 111, to lock the housing base 110 and the main reduction gear 20.

Refer to FIG. 2. This application further provides a powertrain 2. The powertrain 2 includes an oil line system, a power source 30, a main reduction gear 20, and the differential 10 described in any one of the foregoing implementations, where the main reduction gear 20 is fixedly connected to a housing 100 of the differential 10, the power source 30 is in transmitted connection to the main reduction gear 20 to power the main reduction gear 20, and the oil line system can transport coolant oil into the housing 100 through a window 101 to cool or lubricate a component inside the housing 100.

Refer to FIG. 1. This application further provides a vehicle 1. The vehicle 1 includes a vehicle body 11 and the powertrain 2, where the powertrain 2 is mounted on the vehicle body 11; or the vehicle 1 includes a vehicle body 11 and the differential 10, where the differential 10 is mounted on the vehicle body 11.

The differential, the powertrain, and the vehicle provided in embodiments of this application are described in detail above. The principles and embodiments of this application are described in this specification by using specific examples. The descriptions about the foregoing embodiments are merely provided to help understand the method and core ideas of this application. In addition, a person of ordinary skill in the art can make variations and modifications in terms of the specific embodiments and application scopes according to the ideas of this application. In conclusion, the content of this specification shall not be construed as a limitation to this application.

What is claimed is:

1. A differential device, wherein the differential device is configured to receive, through a main reduction gear, power transmitted from a power source and drive two drive shafts, and the differential device comprises:

a housing, wherein the housing is configured to be fixedly connected to the main reduction gear, and the housing is operable to rotate around an axial direction of the housing under a drive of the main reduction gear;

three planetary gears, wherein each of the three planetary gears is mounted on an inner wall of the housing through a pin shaft and disposed spaced from each other along a circumferential direction of the housing, and the circumferential direction of the housing is a direction of rotation of the housing;

two side gears, wherein the two side gears are disposed on two sides of the three planetary gears along the axial direction of the housing, each side gear is meshed with the three planetary gears, and the main reduction gear is configured to drive the housing to rotate around the axial direction of the housing, wherein the three planetary gears are configured to drive the two side gears to drive the two drive shafts respectively; and at least one window, wherein the at least one window is configured for use in inflow or outflow of coolant, and the at least one window is configured to penetrate through the housing and is located between axes of two adjacent planetary gears, wherein the housing comprises a housing base and a concave sub-housing that are connected along the axial direction of the housing, the housing base comprises a first groove, the concave sub-housing comprises a second groove, and the first groove and the second groove together constitute the at least one window; and wherein an inner surface of the housing has three planetary gear mounting surfaces disposed spaced from each other along the circumferential direction of the housing, the three planetary gear mounting surfaces are configured to respectively mount the three planetary gears, each of the at least one window is located between two adjacent planetary gear mounting surfaces, and the three planetary gear mounting surfaces protrude inwardly from the inner surface of the housing.

2. The differential device according to claim 1, wherein two side gear mounting surfaces that are disposed oppositely to each other along the axial direction of the housing are disposed on an inner surface of the housing, the two side gear mounting surfaces are configured to respectively mount the two side gears, and the window is located between two adjacent side gear mounting surfaces.

3. The differential device according to claim 1, wherein a ratio of a total area of the at least one window to a surface area of the housing is greater than or equal to ⅓.

4. The differential device according to claim 1, wherein the at least one window comprises three windows, and the three windows and the three planetary gears are disposed in an alternating sequence in the circumferential direction of the housing.

5. The differential device according to claim 1, wherein the three planetary gears are respectively sleeved on three pin shafts, and one end of each of the three pin shafts is fastened to the housing, and the other ends of the three pin shafts are fastened to each other via a central sleeve ring.

6. The differential device according to claim 1, wherein the two side gears are respectively mounted on the housing base and the concave sub-housing, and the at least one window is located in the concave sub-housing.

7. The differential device according to claim 6, wherein:
the concave sub-housing comprises a concave sub-housing base, a concave sub-housing body, and a concave sub-housing top that are sequentially connected along the axial direction of the housing,
the concave sub-housing base is fastened to the housing base,
one of the two side gears is mounted on an inner side of the concave sub-housing top,
the at least one window is disposed on the concave sub-housing body, and
the at least one window separately adjoins the concave sub-housing base and the concave sub-housing top along two side walls of the axial direction of the housing.

8. The differential device according to claim 1, wherein:
the housing base comprises a housing base plate and an annular sub-housing that is fastened to the housing base plate and that faces a side of the concave sub-housing,
an end that is of the annular sub-housing and that is away from the housing base plate is fixedly connected to the concave sub-housing,
an end that is of the annular sub-housing and that faces the concave sub-housing has the first groove,
an end that is of the concave sub-housing and that faces the housing base has the second groove.

9. A powertrain, comprising an oil line system, a power source, a main reduction gear, and a differential device, wherein the main reduction gear is fixedly connected to a housing of the differential device, the power source is in transmitted connection to the main reduction gear to power the main reduction gear, and the oil line system is configured to transport coolant oil into the housing through a window to cool or lubricate a component inside the housing, and wherein the differential device is configured to receive, through the main reduction gear, power transmitted from the power source and drive two drive shafts, and the differential device comprises:

the housing, wherein the housing is configured to be fixedly connected to the main reduction gear, and the housing is operable to rotate around an axial direction of the housing under a drive of the main reduction gear;

three planetary gears, wherein each of the three planetary gears is mounted on an inner wall of the housing through a pin shaft and disposed spaced from each other along a circumferential direction of the housing, and the circumferential direction of the housing is a direction of rotation of the housing;

two side gears, wherein the two side gears are disposed on two sides of the three planetary gears along the axial direction of the housing, each side gear is meshed with the three planetary gears, and the main reduction gear is configured to drive the housing to rotate around the axial direction of the housing, wherein the three planetary gears are configured to drive the two side gears to drive the two drive shafts respectively; and at least one window, wherein the at least one window is configured for use in inflow or outflow of coolant, and the at least one window is configured to penetrate through the housing and is located between axes of two adjacent planetary gears, wherein the housing comprises a housing base and a concave sub-housing that are connected along the axial direction of the housing, the housing base comprises a first groove, the concave sub-housing comprises a second groove, and the first groove and the second groove together constitute the at least one window; and wherein an inner surface of the housing has three planetary gear mounting surfaces disposed spaced from each other along the circumferential direction of the housing, the three planetary gear mounting surfaces are configured to respectively mount the three planetary gears, each of the at least one window is located between two adjacent planetary gear mounting surfaces, and the three planetary gear mounting surfaces protrude inwardly from the inner surface of the housing.

10. The powertrain according to claim 9, wherein two side gear mounting surfaces that are disposed oppositely to each other along the axial direction of the housing are disposed on an inner surface of the housing, the two side gear mounting surfaces are configured to respectively mount the two side gears, and the at least one window is located between two adjacent side gear mounting surfaces.

11. The powertrain according to claim 9, wherein a ratio of a total area of the at least one window to a surface area of the housing is greater than or equal to ⅓.

12. The powertrain according to claim 9, wherein the at least one window comprises three windows, and the three windows and the three planetary gears are disposed in an alternating sequence in the circumferential direction of the housing.

13. The powertrain according to claim 9, wherein the three planetary gears are respectively sleeved on three pin shafts, and one end of each of the three pin shafts is fastened to the housing, and the other ends of the three pin shafts are fastened to each other via a central sleeve ring.

14. The powertrain according to claim 9, wherein the two side gears are respectively mounted on the housing base and the concave sub-housing, and the at least one window is located in the concave sub-housing.

15. The powertrain according to claim 9, wherein:
the concave sub-housing comprises a concave sub-housing base, a concave sub-housing body, and a concave sub-housing top that are sequentially connected along the axial direction of the housing,
the concave sub-housing base is fastened to the housing base,
one of the two side gears is mounted on an inner side of the concave sub-housing top,
the at least one window is disposed on the concave sub-housing body, and
the at least one window separately adjoins the concave sub-housing base and the concave sub-housing top along two side walls of the axial direction of the housing.

16. A vehicle, comprising a vehicle body and a powertrain mounted on the vehicle body, wherein the powertrain comprises an oil line system, a power source, a main reduction gear, and a differential device, wherein the main reduction gear is fixedly connected to a housing of the differential device, the power source is in transmitted connection to the main reduction gear to power the main reduction gear, and the oil line system is configured to transport coolant oil into the housing through a window to cool or lubricate a component inside the housing, and wherein the differential device is configured to receive, through the main reduction gear, power transmitted from the power source and drive two drive shafts, and the differential device comprises:
the housing, wherein the housing is configured to be fixedly connected to the main reduction gear, and the housing is operable to rotate around an axial direction of the housing under a drive of the main reduction gear;
three planetary gears, wherein each of the three planetary gears is mounted on an inner wall of the housing through a pin shaft and disposed spaced from each other along a circumferential direction of the housing, and the circumferential direction of the housing is a direction of rotation of the housing;
two side gears, wherein the two side gears are disposed on two sides of the three planetary gears along the axial direction of the housing, each side gear is meshed with the three planetary gears, and the main reduction gear is configured to drive the housing to rotate around the axial direction of the housing, wherein the three planetary gears are configured to drive the two side gears to drive the two drive shafts respectively; and
at least one window, wherein the at least one window is configured for use in inflow or outflow of coolant, and the at least one window is configured to penetrate through the housing and is located between axes of two adjacent planetary gears,
wherein the housing comprises a housing base and a concave sub-housing that are connected along the axial direction of the housing, the housing base comprises a first groove, the concave sub-housing comprises a second groove, and the first groove and the second groove together constitute the at least one window; and
wherein an inner surface of the housing has three planetary gear mounting surfaces disposed spaced from each other along the circumferential direction of the housing, the three planetary gear mounting surfaces are configured to respectively mount the three planetary gears, each of the at least one window is located between two adjacent planetary gear mounting surfaces, and the three planetary gear mounting surfaces protrude inwardly from the inner surface of the housing.

17. The vehicle according to claim 16, wherein two side gear mounting surfaces that are disposed oppositely to each other along the axial direction of the housing are disposed on an inner surface of the housing, the two side gear mounting surfaces are configured to respectively mount the two side gears, and the window is located between two adjacent side gear mounting surfaces.

18. The vehicle according to claim 16, wherein a ratio of a total area of the at least one window to a surface area of the housing is greater than or equal to ⅓.

19. The vehicle according to claim 16, wherein the at least one window comprises three windows, and the three windows and the three planetary gears are disposed in an alternating sequence in the circumferential direction of the housing.

20. The vehicle according to claim 16, wherein the three planetary gears are respectively sleeved on three pin shafts, and one end of each of the three pin shafts is fastened to the housing, and the other ends of the three pin shafts are fastened to each other via a central sleeve ring.

* * * * *